(12) United States Patent
Ford et al.

(10) Patent No.: US 6,711,535 B2
(45) Date of Patent: Mar. 23, 2004

(54) METHOD AND APPARATUS FOR PERFORMING FIELD DATA COLLECTION

(75) Inventors: Terry Edward Ford, Aurora, CO (US); John Anthony Yotka, Aurora, CO (US); Richard James Turek, Jr., Aurora, CO (US)

(73) Assignee: Datria Systems, Inc., Englewood, CO (US)

( * ) Notice: Subject to any disclaimer, the term of this patent is extended or adjusted under 35 U.S.C. 154(b) by 133 days.

(21) Appl. No.: 09/879,348

(22) Filed: Jun. 12, 2001

(65) Prior Publication Data

US 2001/0053970 A1 Dec. 20, 2001

(Under 37 CFR 1.47)

Related U.S. Application Data

(63) Continuation of application No. 08/714,583, filed on Sep. 16, 1996, now Pat. No. 6,272,457.

(51) Int. Cl.[7] .................. G06F 17/20; G06F 17/40; G06F 17/60; G01C 21/00
(52) U.S. Cl. .................. 704/1; 704/9; 704/270; 342/357.06; 342/357.09; 701/208
(58) Field of Search .................. 704/1, 9, 270, 704/276; 342/357.06, 357.09, 357.13; 455/456; 701/208, 213

(56) References Cited

U.S. PATENT DOCUMENTS

| | | | |
|---|---|---|---|
| 4,656,463 A | 4/1987 | Anders et al. | |
| 4,677,429 A | 6/1987 | Glotzbach | |
| 4,731,613 A | 3/1988 | Endo et al. | |
| 4,791,572 A | 12/1988 | Green, III et al. | |
| 4,814,711 A | 3/1989 | Olsen et al. | |
| 4,815,012 A | 3/1989 | Feintuch | |
| 4,891,761 A | 1/1990 | Gray et al. | |
| 4,994,971 A | 2/1991 | Poelstra | |
| 5,170,164 A | 12/1992 | Lewis | |
| 5,193,185 A | 3/1993 | Lanter | |
| 5,214,757 A | 5/1993 | Mauney et al. | |
| 5,329,464 A | 7/1994 | Sumic et al. | |
| 5,381,338 A | 1/1995 | Wysocki et al. | |
| 5,414,462 A | 5/1995 | Veatch | |
| 5,418,906 A | 5/1995 | Berger et al. | |
| 5,426,780 A | 6/1995 | Gerull et al. | |
| 5,649,060 A | * 7/1997 | Ellozy et al. ............... 704/270 |

OTHER PUBLICATIONS

Nu–Metrics, Inc., "Nu–Metrics Instrumentation Roadstar 40A Distance Measuring Computer," pp. 1–2.

Nu–Metrics, Inc., "Interfacing Trastar to the Novastar Highway Inventory System–NuMetrics Product Brochure," 1987, pp. 8–9.

(List continued on next page.)

Primary Examiner—Patrick N. Edouard
(74) Attorney, Agent, or Firm—Gibson, Dunn & Crutcher LLP; Stanley J. Gradisar

(57) ABSTRACT

A data collection and automatic database population system which combines global positioning system (GPS), speech recognition software, radio frequency (RF) communications, and geographic information system (GIS) to allow rapid capture of field data, asset tracking, and automatic transfer of the data to a GIS database. A predefined grammar allows observations to be continuously captured along with GPS location and time, and stored on the field mobile unit. A mobile unit's location is tracked in real time or post processed through wireless RF transmission of location information between the mobile unit and a central processing station. The captured data is electronically transferred to a central processing station for quality assurance and automatic population of the GIS database. The system provides for automatic correlation of field data with other GIS database layers. Tools to generate predefined or user defined reports, work orders, and general data queries allow exploitation of the GIS database.

37 Claims, 9 Drawing Sheets

OTHER PUBLICATIONS

GeoResearch, Inc., "Digitize Directly on the Face of the Earth—GeoLink Product Brochure".

John D. Bossler, "GPS and GIS" Geo Info Systems, Mar. 1991 pp. 27–37.

Don Cromer, "Highway Maintenance Goes High Tech: The GIS/GPS Link," GPS World, Sep./Oct. 1990, pp. 42–44.

Peter Byman, "Mapping Finnish Roads with Differential GPS and Dead Reckoning," GPS World, Feb. 1991, pp. 38–42.

Tom Appleby, "Digital Road Mapping with GPS and GIS," GPS World, May 1991, pp. 33–37.

"3–D Real Time Scanning, GPS Digitizing Device Can Be Used With ARC/INFO," ARC News, Winter 1989, p. 33.

* cited by examiner

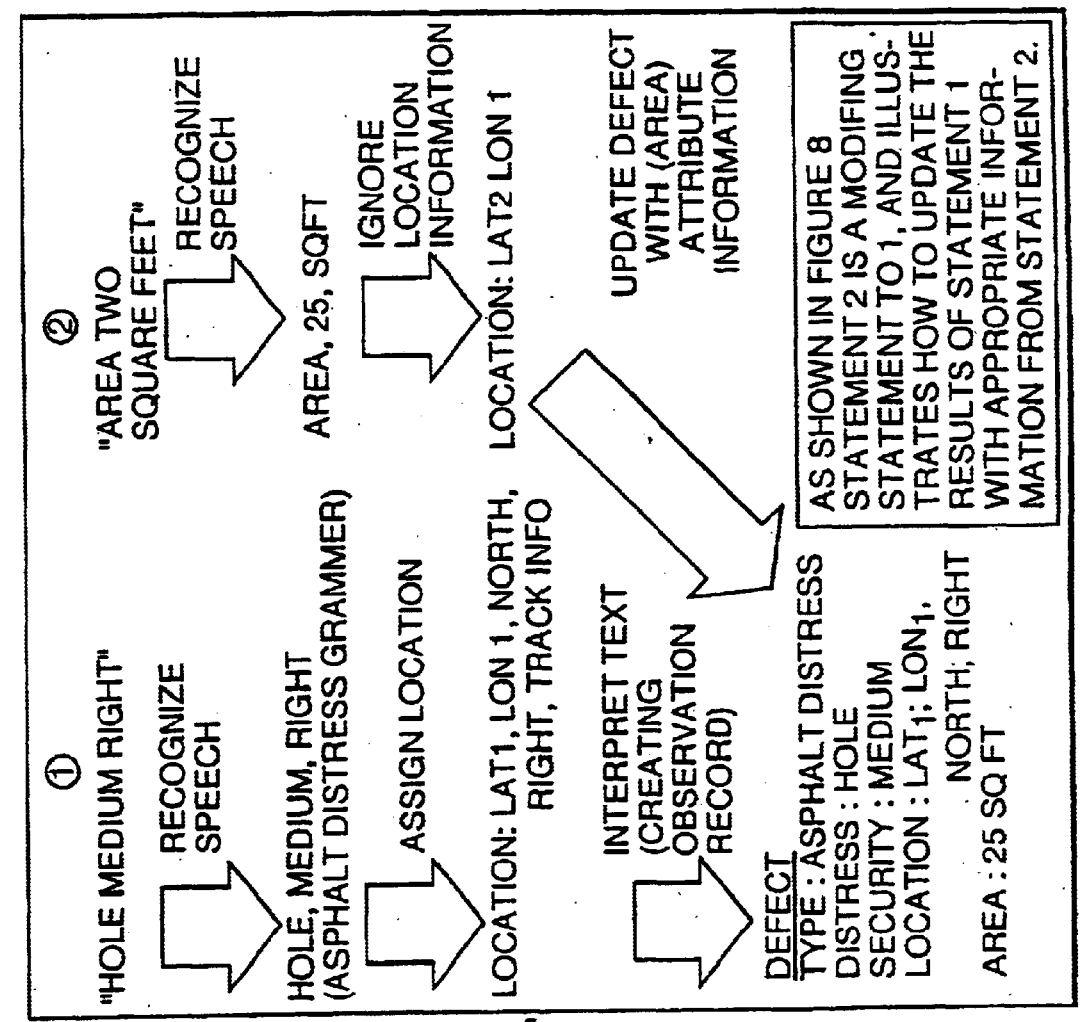
FIG_6
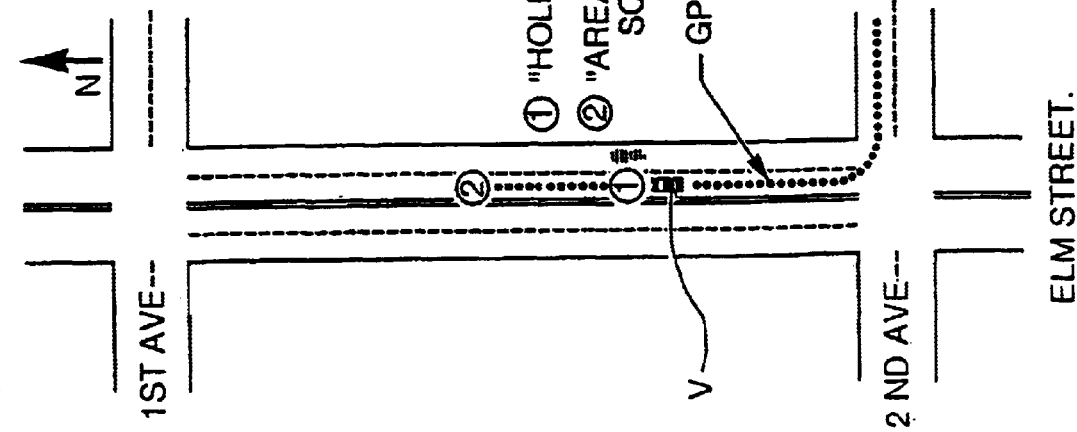
FIG_5

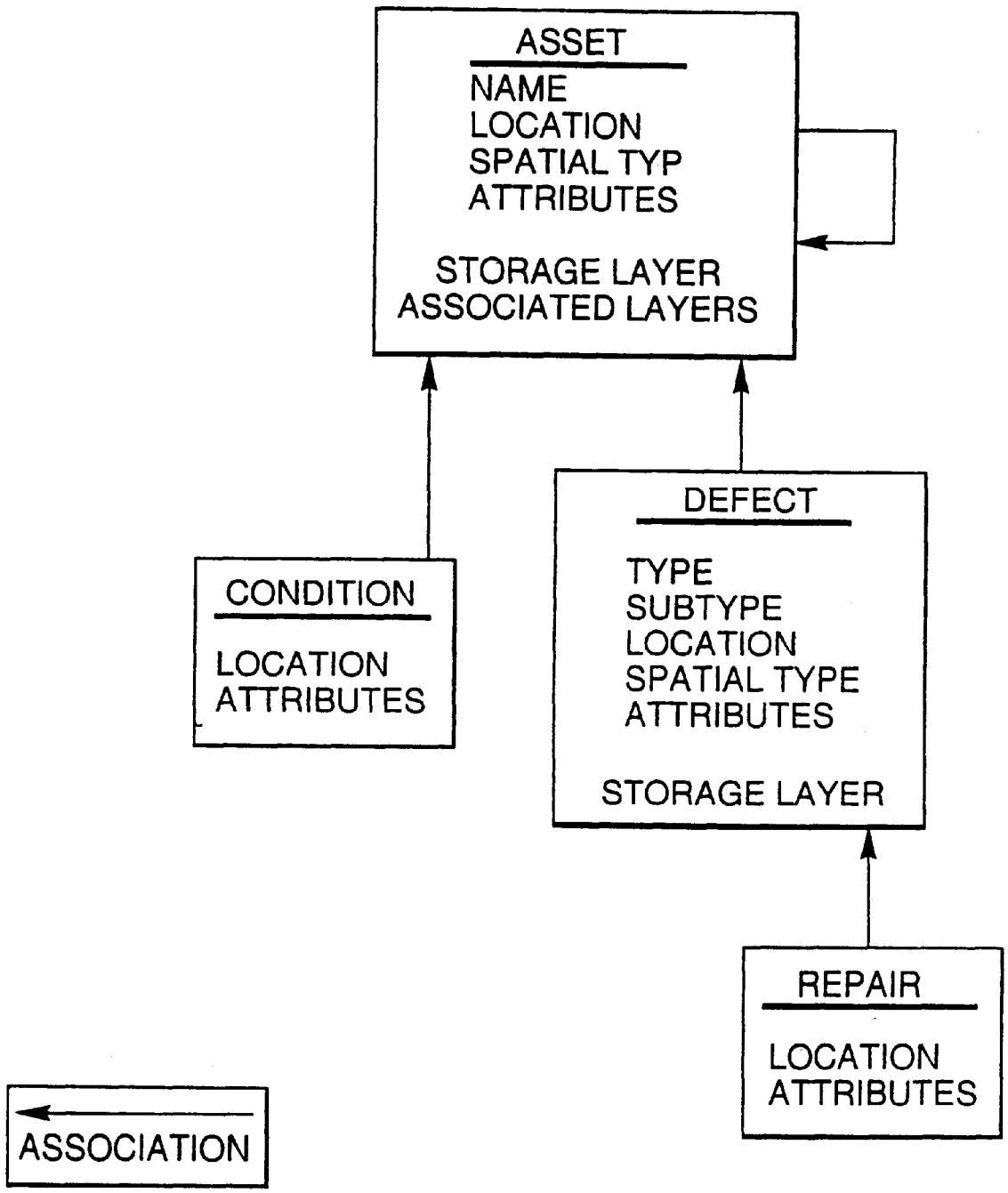
FIG_7

FIG 11A

CONTEXT: asphaltproject ( ASPHALT PROJECT LEVEL GRAMMER)

OBSERVATION TEMPLATES : (OBSERVATIONS → GIS DATA)   ← TWO OBSERVATION TEMPLATE EXAMPLES SHOWN: "shrparea" and "blob"

shrparea   TAG : shrp   DESC : *This is an area shrp observation*

{%sSHRPAREA; %t; %p;distress%e; condition %e; streetpos %e; center; area % m : blob, sqft, 50;} blob   TAG : AREA   DESC : THIS IS A BLOB (CIRCLE) AREA OBSERVATION

{%sBLOB; sqft%n;}

SENTENCE TEMPLATES: (SENTENCES MAKE UP OBSERVATIONS)   ← TWO SENTENCE TEMPLATE EXAMPLES SHOWN: "shrpdistressarea" and "areasqft"

shrpdistressarea   TAG: shrparea   PrcType: new observation (a SHRP distress object)

| | | |
|---|---|---|
| Slot: distressarea | Tag: distress | PrcType: copy |
| Slot: severity | Tag: condition | PrcType: copy |
| Slot: streetloc | Tag: streetpos | PrcType: copy |

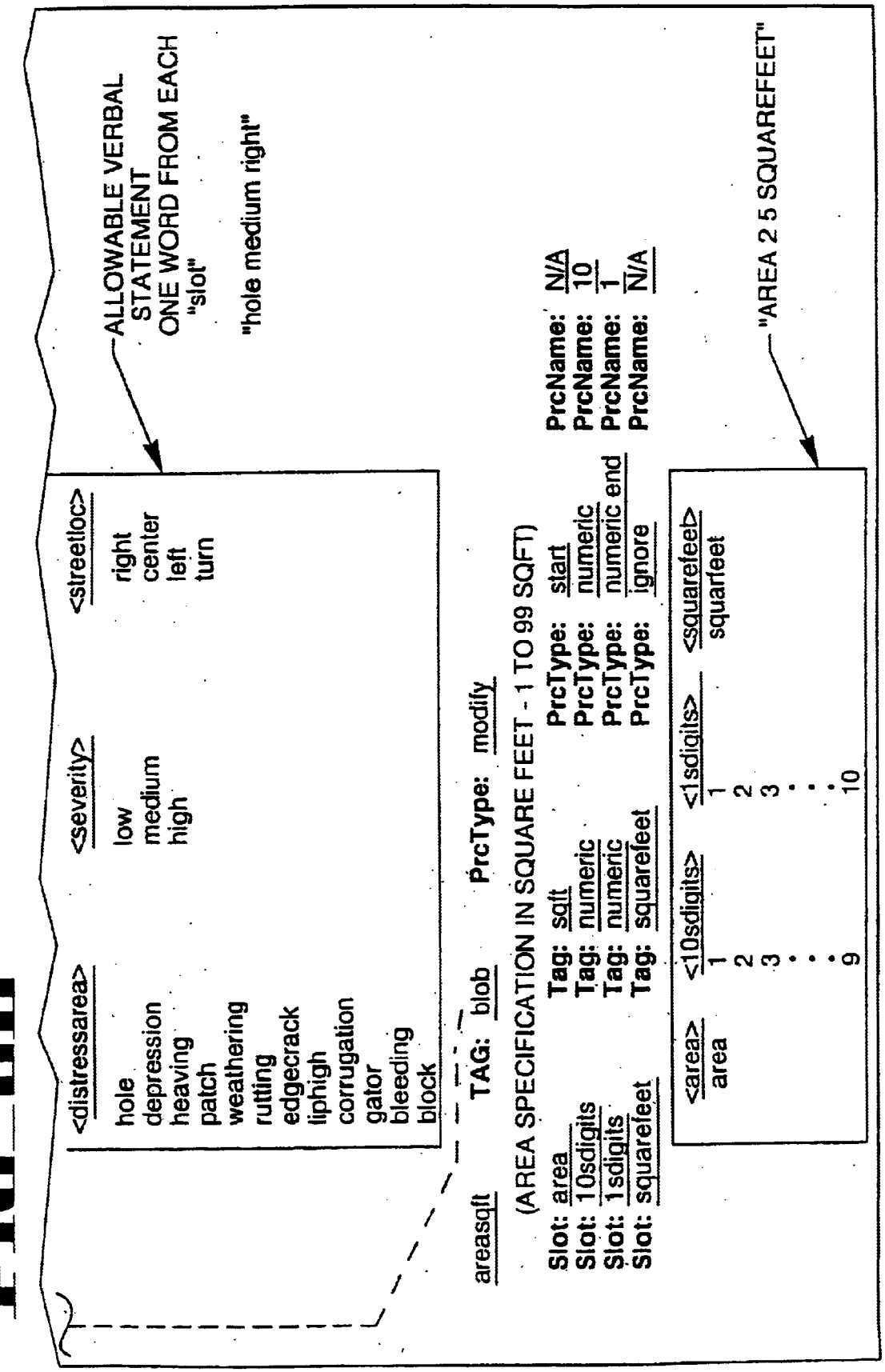

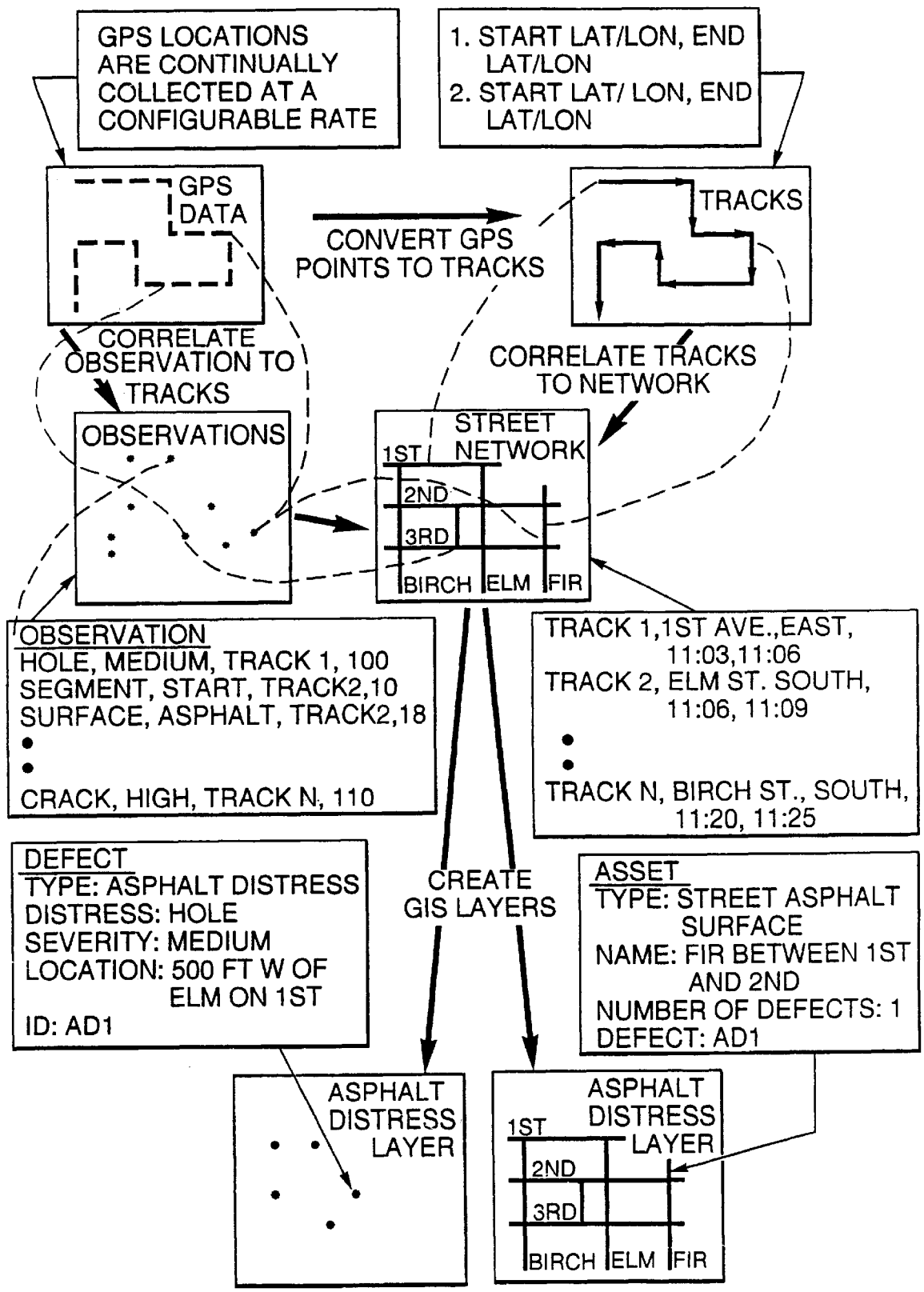
FIG_9

METHOD AND APPARATUS FOR PERFORMING FIELD DATA COLLECTION

CROSS REFERENCE TO RELATED APPLICATION

This application is a continuation application of application Ser. No. 08/714,583, filed on Sep. 16, 1996, now U.S. Pat. No. 6,272,457 which is hereby incorporated herein by reference and a claim to priority is made hereby.

FIELD OF THE INVENTION

This invention relates to methods for combining Global Positioning System ("GPS"), Speech Recognition, Radio Frequency ("RF"), and Geographic Information System ("GIS") to perform mobile field data collection and automatic population of a GIS database with fully attributed and correlated observation data. The system relates particularly to a field data capture system and automatic GIS database population tool for a user to build GIS layers and fully exploit the data in the GIS.

BACKGROUND OF THE INVENTION

Organizations responsible for the maintenance and inventory of assets are turning to GIS as the tool of choice to manage and display these assets. Over eighty percent of the cost of a GIS is capturing and placing accurate, fully attributed data into the GIS. These costs have prohibited many users from either implementing or fully exploiting the GIS.

A number of different methods have been developed for capturing data in the field. Many users use the data collection method of traveling an inspection route, visually identifying the location, and hand writing a description onto a form or a paper entry. Once the inspector returns to the central data repository the entries so collected are manually entered into a database with questionable accuracy and time consuming labor. The user must build the correlation and association logic into the database to create a useful tool. Back end applications must also be created so that the information is useful to the user. More sophisticated methods include GPS with push button data collection or pen computer data entry units which allow predefined buttons and menus to be used for field data collection. The data can be electronically downloaded into a database, but a user must still build the correlation and association logic. The information downloaded is limited to point information with limited attribute information.

Audio based data entry systems have been developed but are limited to the recording of street point information sequenced with a manually recorded location input. The user is then required to manually convert, transfer, and combine the location data with the audio data. There is no processing of the audio data and manual transcription, and tagging of the entries with location data must be manually performed by the user. Only location data where a observation has been recorded is stored, and all other location information is ignored. Other speech recognition systems require the user to prerecord their speech to replace keyboard entries. None of the described systems provide the automatic population of the GIS with fully attributed and correlated data generated from speech recognition.

As users of spatial data incorporate GIS and GPS based technology, the need for a flexible, true end to end system that collects field data, populates a GIS, tracks field assets, and provides tools to exploit the data will increase.

SUMMARY OF THE INVENTION

It is an object of the present invention to provide a method and system for a speech recognition based field data capture system, asset tracking, and automatic GIS database population tool for a user to build GIS layers, to track assets, and to fully exploit the data in the GIS.

It is an object of the present invention to combine GPS, Speech Recognition, and GIS, and to provide field data collection, automatic GIS database population, and exploitation of the GIS data.

it is an object of the present invention to provide the real time tracking of assets in the field through the combination of GPS and RF communications.

In furtherance of these objects, a field mobile unit capable of continuously capturing feature observations from predefined grammar and free speech, as well as GPS based location information time-stamped and automatically stored on the units onboard memory, is created. Location information is automatically corrected in the field using Differential Global Positioning Service ("DGPS") and RF wireless data transmission. The location information is automatically combined with observation information to provide a continuous record of locations and observations.

The preferred mobile field unit device is mounted in a vehicle or backpack. The audio headset microphone provides the means for initiating a speech-based description of user observations. The mobile unit computer provides the onboard data storage of speech observations and the GPS time-stamped location signal. The unit provides the ability to electronically transfer field data. The unit provides an audio feedback to the user to optimize speech entry start and stop, as well as notify the user of loss of GPS signal. The grammar structure provides self editing tools as well as a comprehensive description of field observations.

In the preferred form of the invention the location and observation information is transferred electronically to the central data repository or via RF wireless media. The audio data process automatically converts the audio data collected in the field using the semantic information in the reference grammar and creates data records representing the information content of the user's verbal observations. The user can validate and correct observation statements. Interactive tools allow the user to review all speech entries and correct them as required. The results are user validated and grammatically valid.

The preferred form of the invention automatically merges the corrected location data and the recognized text data and precisely synchronizes the verbal data to a location, as well as identifying any continuous span of tracks covered by an observation. The data is then automatically entered into the GIS database and correlated to linear networks and point observations within the central data repository.

The preferred form of the invention provides predefined or customer configurable tools to exploit the data in the central data repository. Work orders, custom reports, and data query scripts are created using these tools.

The vehicle location information is derived from GPS which provides a time-stamp from which absolute location coordinates may be determined through interpolation of recorded GPS data points.

Methods and apparatus which incorporate the features described above and which are effective to function as described above comprise specific objects of the present invention.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles.

BRIEF DESCRIPTION OF THE DRAWING VIEWS

FIG. 1 is a diagrammatic view of a spatial asset management system constructed in accordance with one embodiment of the present invention. FIG. 1 shows the processes, the data elements used in the processing, and the user interaction with the system. FIG. 1 is a high level overview of the system.

FIG. 2 is a diagrammatic view showing the details of the 1.0 Data Conversion process of FIG. 1. FIG. 2 shows the 1.0 Data Conversion processing in conjunction with the collected data elements and the reference data elements and the user interaction. FIG. 2 shows both the Audio Data 1.A and GPS Data 1.B going through their appropriate processing paths and being merged into an Observation 1.G. FIG. 2 also shows, in the component labeled Track 1.F, the historical representation of where the field operator had been and when the field operator had been there. The Observation 1.G and the Track 1.F are two key outputs of the 1.0 Data Conversion process shown in FIG. 2. Semantic analysis is performed in the 1.6 Interpret Text process and by use of the Reference Observation Semantics 1.E to create the Observation 1.G.

FIG. 3 is a diagrammatic view showing details of the in the 2.0 Data Correlation process of FIG. 1. FIG. 3 shows the two main data inputs (the Track 1.F and the Observation 1.G) coming from the 1.0 Data Conversion process shown in FIG. 2. FIG. 3 shows that Track 1.F is first correlated to the Reference Network 1.K. FIG. 3 also shows that the input information Track 1.F and Observation 1.G are correlated to the Reference Network 1.K and to the appropriate other layers of the GIS creating a Tour 1.L object. The Tour 1.L object comprises: who collected the data; what data was collected; where the field operator was; what the field operator was doing; when the field operator was collecting the data; and the correlation results.

FIG. 4 is a diagrammatic view showing the 3.0 Repository Update process as updated with the Tour 1.L results. FIG. 4 also shows, the 3.3 Define Repository process and the 3.5 Configure Tour process, the definition of the repository structure.

FIG. 5 is a pictorial view, in plan, showing an example of data collection in the field. FIG. 5 shows a vehicle traveling north on Elm Street. FIG. 5 shows the position of the vehicle by its GPS points and shows two observation events indicated by the numerals 1 and 2. The data input from the observation events is voice data, indicated by the quotations in FIG. 5.

FIG. 6 shows the processing sequence for data conversion for the two specific observation events identified in FIG. 5. FIG. 6 also shows the semantic analysis of associating observation event 2 to observation event 1. The results of the semantic analyses are indicated by the inclined block arrow in the lower part of FIG. 6.

FIG. 7 is a diagrammatic view illustrating the four primary types of data maintained within the Repository 1.M of the system shown in FIG. 1. In FIG. 7 the arrows indicate the data structure relationships. As illustrated in FIG. 7, Assets can always be associated with other Assets, Condition must be associated with an Asset, Defect must be associated with an Asset, and Repair can be associated only with a Defect. FIG. 7 also shows the structure for each of the primary data types. The processing information portion of the structure of each primary observation type is embodied in the association (indicated by the arrows), the Spatial Type information, and the Storage Layer and Associated Layers information. Each of the primary observation types also have Location and Attributes in its structure.

FIG. 8 requires too much illustration area to be capable of being shown on one sheet of drawing and is therefore composed of FIG. 8A (on one sheet of drawings) and FIG. 8B (on the succeeding sheet of drawings). FIG. 8 is an example grammar of the type used in FIGS. 5 and 6 but for a specific asphalt distress observation type. Each of the boxes shown in FIG. 8 represent different sentence types. The two observation events illustrated in FIG. 5 correspond to the respective top box and bottom box in FIG. 8. The semantic information identifying that the second sentence is a modifier of the first sentence is illustrated by the two dashed lines in FIG. 8—the first dashed line going from "Tag:blob" up to the term "blob" and the second dashed line going from "Tag:area" up to the term "area" in the Observation Template. The observation statements in FIG. 5 correspond to the Recognized Text 2.A in FIG. 2, and the Reference Observation Semantics 1.E of FIG. 2 correspond to the information contained in the Asphalt Project Grammar of FIG. 8.

FIG. 9 is an illustration of the 2.0 Data Correlation process using the example illustrated in FIG. 5 and continuing the example shown in FIG. 6. FIG. 5 shows data collection. FIG. 6 shows data conversion. FIG. 9 shows data correlation. FIG. 9 shows how an observation in track data is correlated to an asset (note the results of the correlation show that the Defect is correlated to the street segment on Elm Street between First Street and Second Street). FIG. 9 also illustrates the process of moving data into the appropriate GIS layers in the spatial asset management system of the present invention.

DETAILED DESCRIPTION OF THE INVENTION

FIG. 1 presents an overview of a preferred form of the spatial asset management system and method. Subsequent FIGS. 2–4 expand each major process shown in FIG. 1. For example, the process 1.0 Data Conversion (the top circle in FIG. 1) is expanded into a more detailed flow chart in FIG. 2.

The spatial asset management system and method described herein is a hardware independent system solution for managing assets with a strong geospatial component. The preferred form of the system is implemented in a commercial off-the-shelf laptop or pen-based computer for the mobile system component and a high performance PC for the processing workstation home base computer.

The three data stores Audio Data 1.A, GPS Data 1.B, and Sensor Data 1.C shown in FIG. 1 are generated in the mobile system laptop computer. All subsequent processes and data stores are maintained in the home base computer or workstation.

The system provides for a seamless, fully automatic capture, translation, GIS import, and analysis/processing of asset information as represented by the Audio Data 1.A, GPS Data 1.B, and Sensor Data 1.C stores developed during collection. The mobile unit computer may be hand carried (e.g., backpack) or mounted on a moving vehicle (e.g., car, truck, bicycle).

FIG. 5 illustrates the collection of data whereby the user can drive, or walk along, an inspection route and can comment on observed defects, assets, asset condition or other observations. Also shown in FIG. 5 are the GPS points that are collected by the system.

FIG. 6 shows how the observations in FIG. 5 are processed functionally by the system to become data items that are correlated against existing asset information and analyzed for corrective action by operations personnel.

Figure 1:
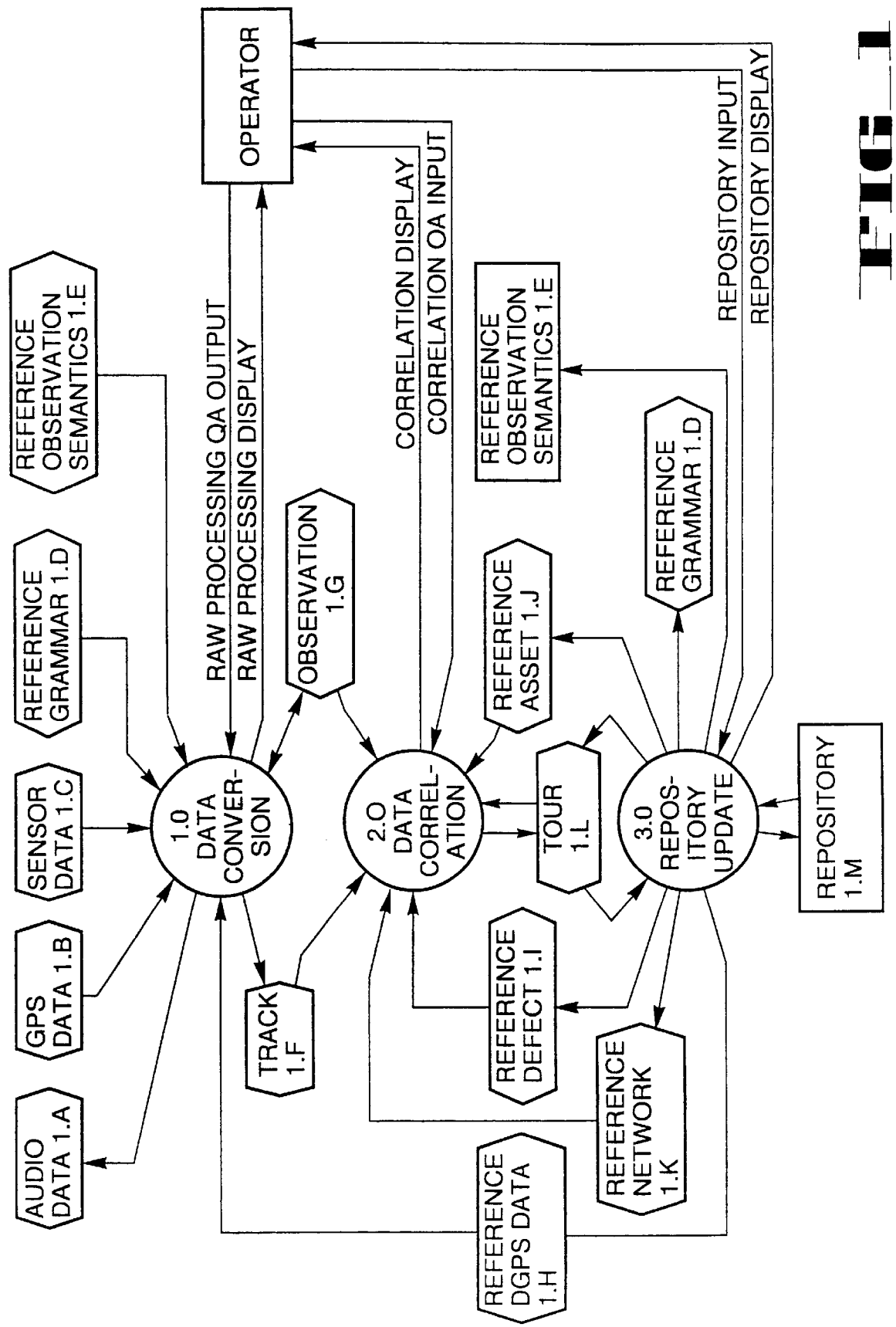

The mobile unit computer is configured with a commercial GPS receiver (or other location receiver device), a standard commercial sound board, and standard I/O devices (e.g., printer, disc drive, RS-232 ports) along with a battery or external power source. Other sensor inputs include such sensors as digital cameras, laser ranging devices, and others. For example, digital camera sensor input allows for photos to be included of city code violations. In this case the digital photo image is automatically tagged and tracked by the system so that photo evidence is included directly in the violation report sent to the offender.

Voice observations are automatically correlated with the sensor inputs to be incorporated as an associated data record. The mobile unit computer captures and time-stamps all data store records. Each data store is independent and no other synchronized signal or input is required other than standard precision time. The Audio Data 1.A store contains all speech audio data detected by the mobile system sound card. The GPS Data 1.B store includes location derived information containing latitude, longitude, and altitude of the mobile unit on a continuous basis once the unit is initialized. The Sensor Data 1.C store contains any external sensor records, such as switch on/off states, analog values, digital photos, laser ranging data, etc.

As will be described in more detail with reference to FIG. 2, the 1.0 Data Conversion process means receives the mobile unit data from Audio Data 1.A, GPS Data 1.B, and Sensor Data 1.C data stores described above. The 1.0 Data Conversion process operates on these inputs in conjunction with reference data (Reference Grammar 1.D, Reference Observation Semantics 1.E, and Reference DGPS Data 1.H) to produce Track 1.F objects and Observation 1.G objects data stores. The functions supported by the 1.0 Data Conversion process are: (1) automatic interpretation of audio data spoken words using a reference dictionary contained within the Reference Grammar 1.D data store, (2) automatic detection of word level interpretation error conditions, (3) automatic interpretation of phrases using pre-defined meaning and phrase syntax contained within the Reference Observation Semantics 1.E data stores, (4) automatic detection of semantic error conditions, (5) optional correction of GPS location data using Reference DGPS Data 1.H, (6) automatic generation of time-based location Track 1.F data objects in internal system format, (7) automatic generation of time-based Observation 1.G data objects in internal system format and (8) operator use of interactive displays to perform Quality Assurance (QA) functions against either Audio Data 1.A or Sensor Data 1.C stores.

The net result of the 1.0 Data Conversion process is a data store of error corrected track information which is an automated time-sequenced track of the mobile unit's historical travel path with precise latitude, longitude and altitude for a given "Tour" (note that Tours are actually generated by the 2.0 Data Correlation process).

Another result of 1.0 Data Conversion process is a time-sequenced and operator quality assurance checked set of observation objects, which represent either "discrete" observations (e.g., "tree, foliage damage," "stop sign, class 1 damage," "pothole, high, right"), "linear" observations (e.g., "start curb and gutter run," "end curb and gutter run," "start road width 32," "end road"), or "polygon" definitions which is a unique form of track data store. These Track 1.F and Observation 1.G data stores are available to the 2.0 Data Correlation process.

FIG. 6 illustrates the buildup of these data types. The system organizes data into a logical contiguous set of collected data that may last from a few minutes to several hours. A street inspection tour, for example, would typically consist of the collection of street distress data for several hours before concluding the collection and submitting the collected data to the home base workstation for processing.

The "discrete" observations captured include any and all assets which are best categorized as an item or set of items at discrete locations. Examples of types of objects collected are signage, lights, street distresses, concrete distresses, park benches, tree damage, utility cuts, utility access covers, fire plugs, incidences of code violations (e.g., weeds, illegal cars parked, damaged fence, etc.), curb damage, sidewalk distresses, and other items of the like. Usually discrete object observations are accompanied by a status, state, or condition which are related to the object and position, a size, or other descriptive term that may help identify or qualify the observation. The phrase "pothole, medium, right," would be translated by the 1.0 Data Conversion process to mean:

"pothole"=pothole type of road distress;

"medium"=distress severity medium;

"right"=the right lane (assuming more than one lane in the current direction of travel).

Similarly "linear" observations are used for assets or objects that are running or continuous in nature for some significant length. Examples are roads, sidewalks, curbs, gutters, fences, paint stripping, property frontage, and others of the like. Linear objects are usually accompanied by state or condition, plus an indication that the running asset starts or stops at some position.

An example might be when an inspector is monitoring the condition of road centerline paint conditions. A phrase may be "start road centerline paint condition 3" which would mean that the inspector is reporting the beginning of a class 3 (e.g., badly worn) status of road stripping condition. This condition may last for several miles. When the condition changes the inspection would terminate the running asset condition with a phrase such as "end road centerline condition 3."

The system interprets and keeps track of all running asset states. In addition the inspector may continue commenting on any other objects or observations while the linear conditions are being tracked. That is to say that the inspection can start a running asset observation (like the road paint stripping), then report on several defects (such as sign damage), and then terminate the running asset conditions. The system automatically keeps track of all such interleaved conditions. Logic errors are automatically detected and identified to the operator during the Quality Assurance processing with the 1.0 Data Conversion process.

Another observation data type is "polygonal." Polygonal data is usually associated with defining areas or boundaries. Using a backpack mounted system, a parks inspector might, for example, walk and define the boundaries of an area of a park, perform a tree or endangered species inventory or forest damage by some infestation. The results would be a polygon that describes the area where the observations are located.

As described in more detail below, the 2.0 Data Correlation process means operates on the Track 1.F and Observation 1.G data stores which are output by the 1.0 Data Conversion process means to perform correlation against a variety of reference data. The 2.0 Data Correlation process organizes and associates Track 1.F data stores with Observation 1.G data stores which are output to produce logical "tours," which are sets of data (collected by the user) such as those discussed earlier.

The 2.0 Data Correlation process automatically routes data items to the proper layer of the GIS database for further processing. For example, signage would be associated with a specific layer of GIS whereas street distresses would be associated with a separate layer. The 2.0 Data Correlation process uses the Reference Asset 1.J data store to correlate the collected discrete asset observation tour data to the existing database of objects (e.g., signs, park benches, etc.) of the same category or class.

The system automatically detects inconsistencies between the collected and reference asset data and brings problems to the attention of the field operator. These inconsistencies can be corrected or edited using Quality Assurance tools provided. Ultimately the reference asset database is updated for future reference.

Similarly, observation tour data which represents discrete defects, (e.g., road potholes, fence damage, curb upheaval, etc.) are correlated and compared against the Reference Defect 1.I data store and are quality assured for consistency and logical error state by the 2.0 Data Correlation process. The 2.0 Data Correlation process also performs the same type of functions for linear observations tour data, such as curbing and sidewalk networks, using the Reference Network 1.K data store. A set of Edit and Quality Assurance tools are provided to support the correlation processing of network type data.

Reference Network 1.K data stores include simple tour location Track 1.F data as well (which allows the system to capture and compare location track data independent of collected discrete, or linear objects). This enables the system to identify which inspectors have inspected which streets and when. It also allows a broad range of tour analysis functions to be accomplished, such as, which areas have streets that have not been inspected for the last three months.

The general functionality supported by the 2.0 Data Correlation process are (1) automatic association of collected data to proper GIS layers, (2) automatic detection of inconsistencies between collected observations and reference data, (3) correction of conflicted data, (4) analysis of tour location track information such as routes traveled with temporal reference, (5) quality assurance of correlated data, and (6) the organization and association of Track 1.F and Observation 1.G into "tours" which are correlated location, observation, and time data sets.

The 3.0 Repository Update process means provide all of the tools to create, update, and generally manage the system reference databases. A primary input to this process is the Tour 1.L data store which is generated by the 2.0 Data Correlation process. The 3.0 Repository Update process provides the tools to create new assets and/or conditions the system will recognize by updating the Reference Grammar 1.D data store and the Reference Observation Semantics 1.E data store along with the appropriate Reference Asset 1.J, Reference Defect 1.I, or Reference Network 1.K data stores. Using this function allows the user to add new types of defects (such as a new type of damage or new class of utility cut in the road), add new asset types, add new tour types (such as utility inspection tours), and any other operational data elements needed.

Data management tools include editing, data consistency checking, data integrity and version control, and backup tools. Operational data store elements are maintained in the Repository 1.M database. The Repository 1.M data store is where the results of system processing are placed.

Using a variety of GIS configured, third party, and Spatial Asset System tools, the field operator/user can gain access to the operational database for analysis and reporting purposes. The analysis and reporting tools include both ad-hoc and predefined analysis and reporting capabilities. They range from such capabilities as visual analysis and interrogation of GIS layers to specific reports on such elements as road defect history in a given neighborhood.

The user can query and generate reports on any and all data contained within the Repository 1.M data stores. Using these tools the user can ask such questions as:

How many of a specific asset type is located within center boundaries?

What are the specific work orders (time to accomplish, etc.) to repair specified road segments?

Show the inspection routes covered by a specified inspector over a given period of time.

Show all road signs that are severely damaged and what is an optimal route for repair.

Figure 2:
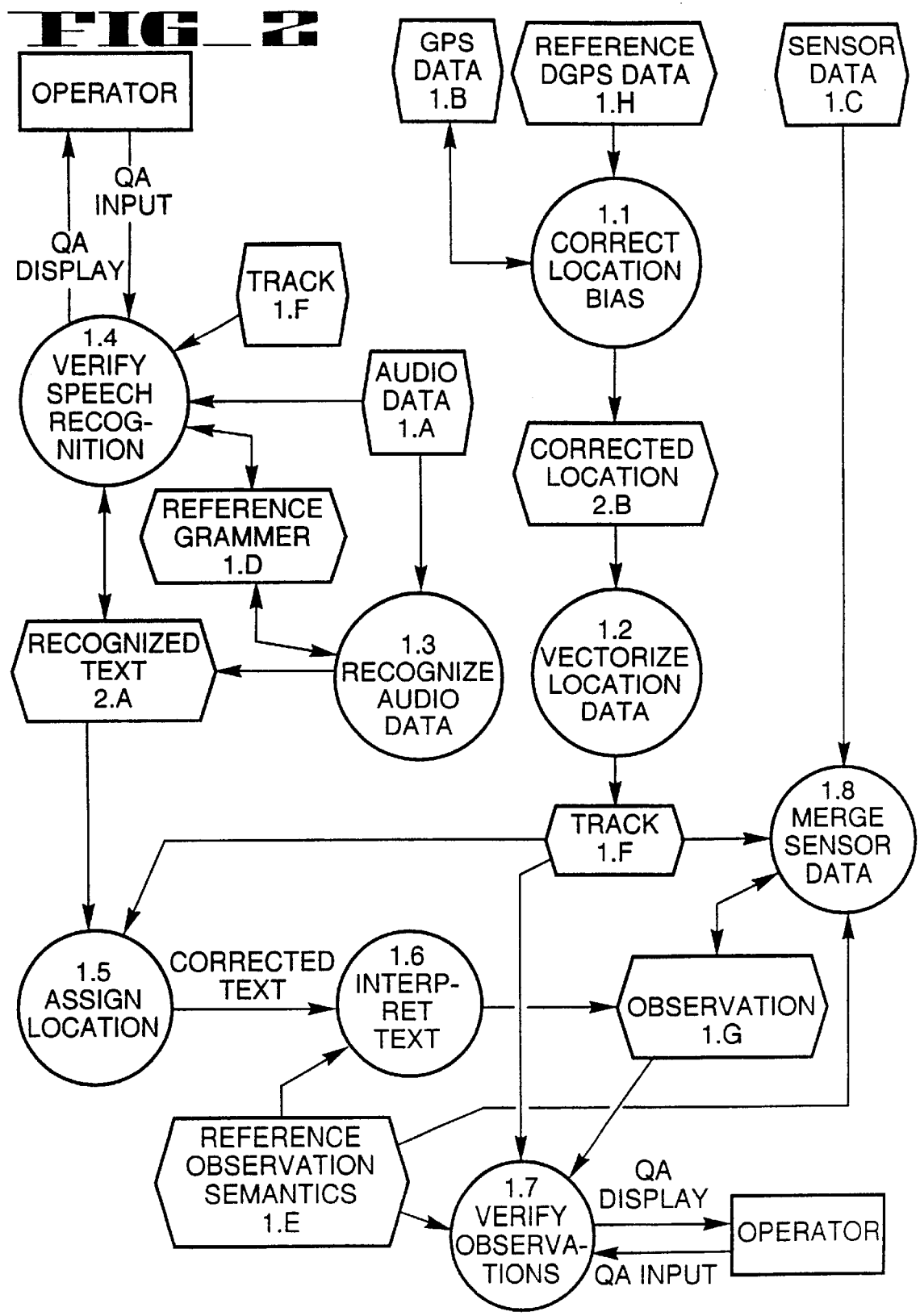

FIG. 2 is a detailed diagrammatic view of the 1.0 Data Conversion process of FIG. 1. From the field collection process the results of the operator's verbal inputs are represented by the data store labeled Audio Data 1.A. These are time-stamped digital audio data segments corresponding to each verbal phrase spoken by the field operator.

The data store identified by the label GPS Data 1.B represents all of the GPS data collected in the field during the operator's trip. The Reference DGPS Data 1.H store is the DGPS correction data collected during the operator's trip.

The 1.1 Correct Location Bias process applies the correction data to the GPS data, if it was not corrected in the field using real-time DGPS. Note that in the preferred implementation the field GPS units can be used in either real-time DGPS mode or post-processing DGPS mode, depending upon the needs of the field operator.

Figure 3:
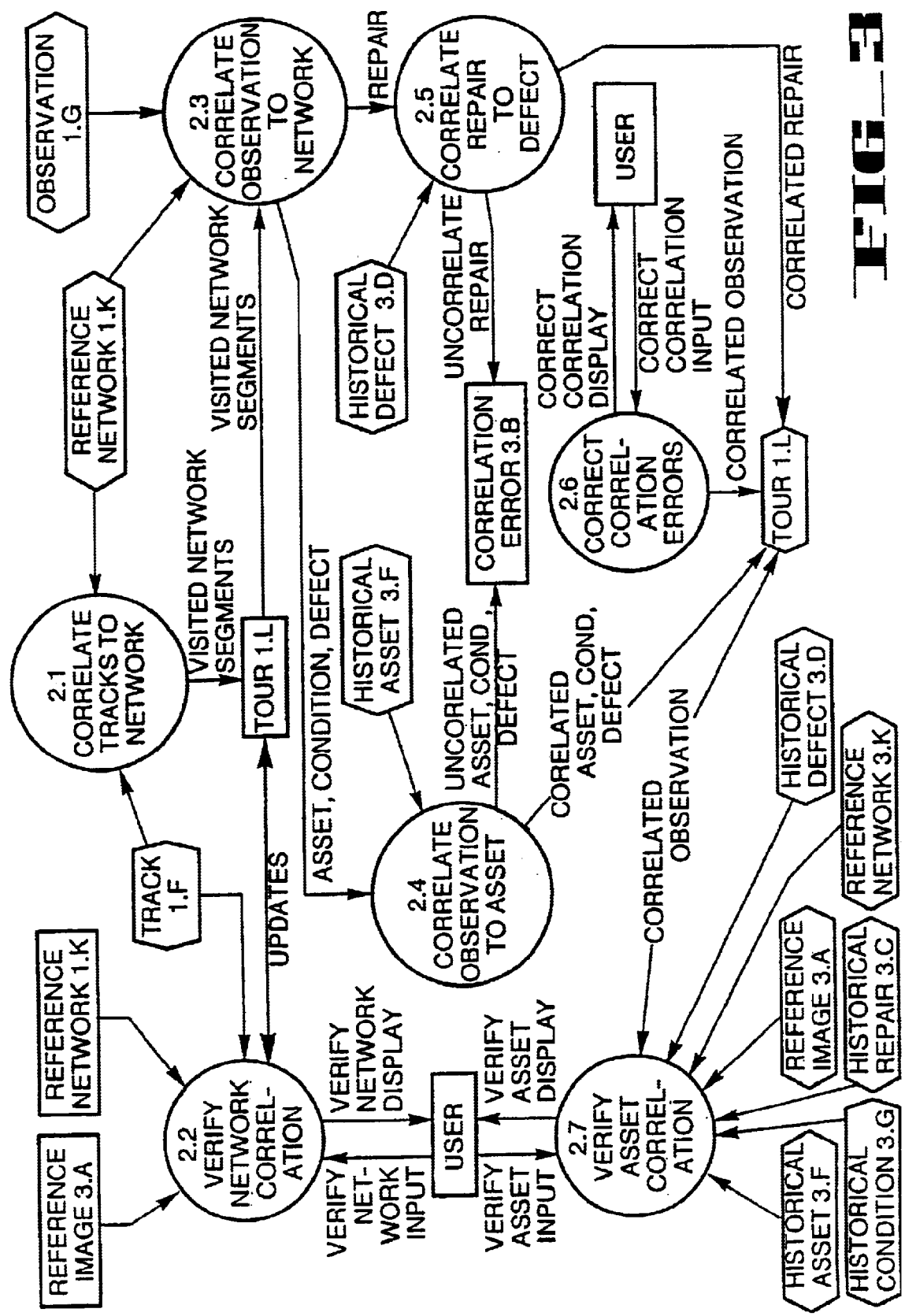

The results of the 1.1 Correct Location Bias process is DGPS corrected location data that is then stored in the Corrected Location 2.B data store. The corrected data is then processed, by 1.2 Vectorize Location Data, to convert the individual point data, (typically collected at 1 second intervals, but any interval period is possible), into track data which is stored in Track 1.F. The purpose of this processing is to compress the point data into a higher order representation of linear and arc based tracks. This compression greatly improves the performance of latter processing illustrated in FIG. 3.

The 1.3 Recognize Audio Data process automatically converts the Audio Data 1.A collected in the field using the semantic information in Reference Grammar 1.D, and creates intermediate data records (Recognized Text 2.A) representing textually/linguistically the information content of the operator's verbal statements made in the field. Note that the field unit can record the audio data in either of two ways. First, it can recognize when voice is present and only record when the operator is speaking, which is the preferred approach. Or the field unit can record all data regardless of whether the operator is speaking.

In the latter case, the 1.3 Recognized Audio Data process will break the continuous audio data into the individual spoken phrases using the same approach as the field unit would use, i.e., energy threshold of the audio data. The user then can validate and correct any problems with the results through the 1.4 Verify Speech Recognition process. With the interactive tools provided in this process the user can review all of the automatic recognition processing and fix any problems encountered.

The Reference Grammar 1.D information is used to maintain the integrity of the resulting fixes. The Track 1.F information is used to provide visual location information to the operator on where they were at the time they made the verbal statement. The results from 1.4 Verify Speech Recognition processing are stored into Recognized Text 2.A. These results are both user validated and grammatically valid.

The 1.5 Assign Location process automatically merges the Track 1.F data and the Recognized Text 2.A data, precisely synchronizing the verbal data to the location data and identifying any contiguous span of tracks covered by an observation. The resulting merged data is forwarded to the 1.6 Interpret Text process. This process uses the Reference Observation Semantic 1.E information to merge the sequence of recognized text into actual Observation 1.G.

It should be noted that the system can take a non-contiguous set of verbal statements and combine them into a single observation. An example of this process is discussed latter, relative to FIG. 8.

The 1.6 Interpret Text process performs the semantic analysis on the sequence of recognized text to determine if it is complete and consistent.

Figure 4:
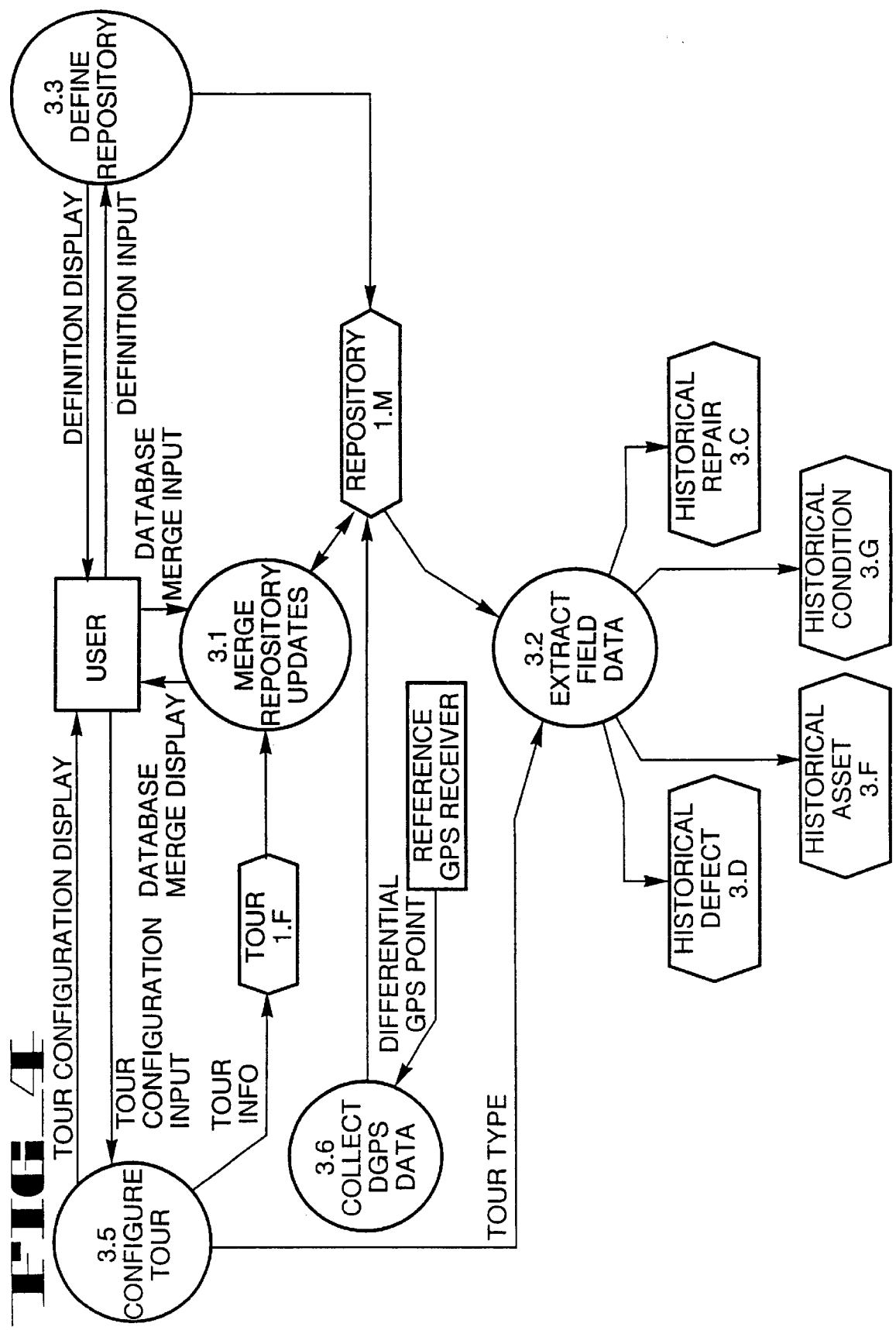

FIG. 4 is the diagrammatic view of the repository maintenance functions. The user interacts with the system through these functions to define the data to be collected and merge the collected data into a central data Repository 1.M. The user interacts with three functions to perform repository maintenance.

The user, through a series of displays in 3.3 Define Repository process, defines the data to be collected and the grammars with semantics used to process the collected field data. The user, through a display in the 3.5 Configure Tour process, identifies what types of data is collected during his field data collection session. By identifying the types of data collected, the system applies the appropriate grammars and semantics to translate the data collected in the field into database records. The user also enters his name, organization and other relevant information.

The user, through a series of displays in the 3.1 Merge Repository Updates process, merges the data collected in the field into the central Repository 1.M. The assets, conditions, defects, and repairs are compared to the appropriate layer of historical data. Any discrepancies in the data are flagged and presented to the user for resolution. A discrepancy is identified when the new data is not consistent with the data already resident in the central Repository 1.M. After discrepancies in the data are resolved, the user approves the changes and the central Repository 1.M is updated.

The 3.6 Collect DGPS Data function continuously collects GPS reference data from a connectable Reference GPS Receiver and stores it in central Repository 1.M. This data is used to correct errors in the field collected GPS data. This correction can be performed post-processed or in real time.

The Repository 1.M data contains all the data for the system including all data stores discussed in earlier figures. This is data collected in the field, historical data, data used but not changed by the system, and reference data. Central Repository 1.M contains, as a minimum, the following historical data: Assets, Conditions, Defects, and Repairs. Central Repository 1.M contains, as a minimum, the following reference data: DGPS Data, Grammars, Semantics, and Imagery.

The Tour 1.L data store contains the information collected in the field and statistics about the field session. The information contained in the tour is at a minimum: the inspector, data, duration, type of inspection, and correctly formatted repository updates. The 3.2 Extract Field Data process provides the function of combining tour data with other historical data stores for processing and use by the user.

FIG. 5 shows an example of data collection in the field. FIG. 5 shows a vehicle V traveling north on Elm street. FIG. 5 shows the position of the vehicle V by its GPS points and shows two observation events indicated by the numerals 1 and 2. The data input from the observation events is voice data, indicated by the quotations in FIG. 5.

FIG. 6 shows the processing sequence for data conversion for the two specific observation events 1 and 2 identified in FIG. 5. FIG. 6 also shows the semantic analysis of associating observation event 2 to observation event 1. The results of the semantic analyses are indicated by the inclined block arrow in the lower part of FIG. 6.

FIG. 7 is the diagrammatic view of the four primary observations types. These four observations represent the possible data collected in the field and maintained in the Repository 1.M and are described in more detail immediately below.

Asset

Asset represents objects in the field that the user wishes to track and maintain. Examples of assets are: street signs, side walks, and curbs. Assets can be related to other assets. For example, a street sign that has one post and two signs attached can be represented as three assets that are associated together. Both Assets and Defects (below) have a spatial type (e.g., point, linear or polygonal). The spatial type and the associated layers information define how the asset information is correlated to other GIS layers during the automatic correlation processing shown in FIG. 3.

For example, street sign assets may be associated to a side GIS layer. This association defines that the location of the sign asset should be altered during processing to snap (or adjust) its position to be on the street edge, not in the street. Similarly, for defects, such as a concrete defect, (e.g., a crack), will be associated to the concrete network asset layer, which in turn is associated with the street edge layer.

Condition

Condition represents attributes of an asset that change over time and or position. The condition of the assets may be established in the system through grammar tables to allow the user to collect a predefined range and classes of conditions. For example, the conditions for street sign could be good, fair, and poor.

Defect

Defect represents a defined flaw in the asset that affect the health or goodness of the asset. Defects can also be set through grammars to reflect a type of defect or a severity.

Repair

Repair is the removal of a defect. As a repair is made the central data Repository 1.M can be updated to reflect the repair and the defect is then automatically removed from the database.

The diagrammatic view of FIG. 7 illustrates the four primary types of data maintained within central Repository 1.M of the system shown in FIG. 1 and also the possible relationships of the types of data. In FIG. 7 (as illustrated by the diagram box in the bottom left hand corner of FIG. 7) the arrows indicate the possible associations of the data structure relationships. Thus, as illustrated in FIG. 7, Assets can always be associated with other Assets, Condition must be associated with an Asset, Defect must be associated with an Asset, and Repair can be associated only with a Defect. FIG. 7 also shows the structure for each of the primary data types. The processing information portion of the structure of each primary observation type is embodied in the association (indicated by the arrows), the Spatial Type information, and the Storage Layer and Associated Layers information. Each of the primary observation types also has Location and Attributes in its structure.

As noted above in the Brief Description of the Drawing Views, FIG. 8 required too much illustration area to be capable of being shown on one sheet of drawings and was therefore composed of FIG. 8A (on one sheet of drawings) and FIG. 8B (on the succeeding sheet of drawings). Since it was necessary to show FIG. 8 on two sheets, the textual content of FIG. 8 is also set out below in this text for convenience in reference.

FIG. 8 is an example grammar of the type used in FIGS. 5 and 6 but for a specific asphalt distress observation type. Each of the boxes shown in FIG. 8 represent different sentence types. The two observation events illustrated in FIG. 5 correspond to the respective top box and bottom box in FIG. 8. The semantic information identifying that the second sentence is a modifier of the first sentence is illustrated by the two dash lines in FIG. 8: the first dashed line going from "Tag:blob" up to the term "blob" and the second dashed line going from "Tag:area" up to "area" in the Observation Template. The observation statements in FIG. 5 correspond to the Recognized Text 2.A in FIG. 2, and the Reference Observation Semantics 1.E of FIG. 2 correspond to the information contained in the asphalt project grammar of FIG. 8.

As noted above, FIG. 8 is an example grammar to the type used in FIGS. 5 and 6 but for a specific asphalt distress observation type. This example grammar illustrates one possible implementation of our method. There are two main sections illustrated in FIG. 8: the Observation Templates and the Sentence Templates. Each of the spoken sentences and the resulting Observation Templates are shown for the examples used in FIGS. 5 and 6.

In the first Observation Template, shrparea, the structure of the resulting observation is defined by the specification enclosed by the "{ }". The "%s" identifies the type of GIS record to create. The "%t" identifies that time is to be included. The "%p" identifies that location is to be included. The "%e" identifies the several different slot values that are to be included (note the ":center" following the streetpos specification indicates that the value of center is a default). The "%m" identifies that there is a future modifying statement to include, and if not found, then "blob,sqft,50" is the default. The semantic relationship between the two separate verbal sentences is further illustrated by the dashed lines that indicate associations between templates, and between sentences and templates.

FIG. 8 further illustrates the semantic structure of the sentence templates. Each sentence, which corresponds to a set of possible verbal statements, is composed of slots. The information of how slot values are transferred to the observation record is defined by the PrcType attribute of each slot.

For the first sentence "shrpdistressarea" each of the slots are copied into the resulting observation record based on slot tag. For the "areasqft" sentence the numeric values are combined to form a true number that is, by convention, assigned to the "area" slot, with tag "sqft," and that is then copied into the "sqft%n" specification of the "blob" Observation Template. In this case the "%n" implies a numeric value required. The result of using this semantic information enables the two distinct verbal observations made in the examples of FIGS. 5 and 6 to be combined automatically into one resulting GIS record.

FIG. 9 illustrates graphically the data correlation process for the examples illustrated in FIGS. 5, 6, and 8.

While data collection is in progress, GPS data points are continuously collected, as well as the audio data and the other sensor data (see FIG. 2). The GPS data record contains the location as well as the time-stamp for that location.

When the system detects voice input by the user, a raw observation is created. This raw observation consists of the recorded voice and a time-stamp. Time is used as the synchronization key between all of the independent data streams: GPS, Audio, and Sensor.

The GPS data points are then compressed into a series of tracks (vectors and arcs) that represent the route taken by the user. Each of the track records consist of a start and stop position. An observation record's location information is determined using time and the GPS data to interpolate the location and the associated track and position along the track. The record consists of the observations text data and other sensor data, the track it was associated to, and the position along the track that the observation was made. These pieces of information are used to correlate the route taken and the observations made to the underlying network segments, which in this example are the street segments that were driven.

In the example shown, the user drives the city streets and makes observations about the condition of the streets. A typical point observation statement is "hole medium." This observation is correlated to the street network, and a record is added to the Asphalt Distress Layer of the GIS. An example of a running observation is the combination "Segment Start", "Surface Asphalt" and "Segment End". These statements make a running observation which would be converted into a series of Asphalt Surface records for each street segment, and partial segment driven over between the "Segment Start" and "Segment End" statements.

Thus, as shown in FIG. 9 the collected GPS data is converted into the Track 1.F data. The Track 1.F data is correlated with the Street Network data. FIG. 9 also shows Defect data being loaded into its Asphalt Distress Layer. This Defect data from the Asphalt Distress Layer is then combined with the Street Network correlation results to create the association of the Defect with the Asset. The process from the GPS data layer to the track data layer (illustrated diagrammatically in FIG. 9) is also illustrated by the 1.2 Vectorize Location Data process in FIG. 2. The linkage from the track layer to the street network layer (illustrated in FIG. 9) is also illustrated by the 2.1 Correlate Tracks To Network process in FIG. 3. The input of the Defect data into the Asphalt Distress Layer (illustrated in FIG. 9) is also illustrated by the 1.6 Interpret Text process of FIG. 2. The linkage between the Asphalt Distress Layer and the Street Network Layer (illustrated in FIG. 9) is also illustrated by the 2.3 Correlate Observation To Network process in FIG. 3. FIG. 9 diagrammatically illustrates the example of FIG. 8 with respect to the two events noted on Elm Street as illustrated in FIG. 5.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

What is claimed is:

1. A method for performing field data collection, the method comprising:
   (a) capturing a verbal observation as audio data;
   (b) time-stamping said audio data;
   (c) capturing location data contemporaneously with said verbal observation with a location receiver device;
   (d) time-stamping said location data;
   (e) interpreting said audio data using semantic information stored in a reference grammar;
   (f) creating a recognized text data record from said interpreted audio data;
   (g) merging said location data and said recognized text data record to form a time-based observation data object; and
   (h) converting said location data into a time-based track data object.

2. The method according to claim 1 wherein said location data comprises at least one of a latitude, a longitude, and an altitude.

3. The method according to claim 1 wherein a user performs the field data collection with:
   a mobile unit in communication with said location receiver device for capturing said location data, wherein said location receiver device comprises a global positioning satellite receiver;
   a microphone in communication with a system sound card in said mobile unit for capturing said verbal observations by said user; and
   a central processing unit clock in said mobile unit for time-stamping said audio data and said location data.

4. The method according to claim 3 further comprising:
   repeating steps (a) through (h) for a plurality of verbal observations yielding a data store of a plurality of time-based track data objects which represent said mobile unit's historical travel path, and a data store of a plurality of time-based observation data objects which represent a time sequence in which said plurality of time-based observation data objects were observed.

5. The method according to claim 4 wherein said merging step (g) further comprises:
   interpreting a phrase comprised of at least two of said recognized text data records utilizing a reference observation semantic.

6. The method according to claim 5 wherein said interpreting a phrase step further comprises:
   detecting semantic error conditions.

7. The method according to claim 4 further comprising:
   associating said plurality of time-based track data objects with said plurality of time-based observation data objects to produce a tour object which comprises a correlated location, observation, and time data set.

8. The method according to claim 3 further comprising:
   capturing an external sensor data contemporaneously with said captured audio data;
   time-stamping said external sensor data; and
   correlating said captured audio data with said captured external sensor data.

9. The method according to claim 8 wherein said external sensor data comprises at least one of a switch on/off state, an analog value, a digital photo data, a laser ranging data, and a sensor digital data collected by a device capable of transmitting said sensor digital data from said device to said mobile unit.

10. The method according to claim 3 further comprising:
    during the field data collection, transporting said mobile unit by at least one of a vehicle, a bicycle, a backpack, and a carrying by hand.

11. The method according to claim 3 further comprising:
    performing quality assurance functions by said user through interactive displays presented on said mobile unit.

12. The method according to claim 3 further comprising:
    transferring said time-based observation data object and said time-based track data object from said mobile unit to a processing computer for storage in a geographic information system database associated with said processing computer.

13. The method according to claim 12 further comprising:
    routing said transferred time-based observation data object to a proper layer of said geographic information system database.

14. The method according to claim 12 further comprising:
    detecting inconsistencies between said time-based observation data object and a reference data store.

15. The method according to claim 1 further comprising:
    correcting said location data in real-time utilizing a reference Differential Global Positioning Service (DGPS) data.

16. The method according to claim 1 further comprising:
    correcting said location data utilizing a reference Differential Global Positioning Service (DGPS) data in a post-processing mode.

17. The method according to claim 1 wherein said location receiver device comprises a global positioning satellite receiver.

18. The method according to claim 1 wherein said interpreting step (e) further comprises:
    detecting word level interpretation error conditions.

19. The method according to claim 1 wherein said time-based observation data object comprises at least one of an asset observation, a condition observation, a defect observation, and a repair observation.

20. The method according to claim 19 wherein said asset observation and said defect observation further comprise a spatial type observation, wherein said spatial type observation comprises at least one of a discrete observation, a linear observation, and a polygonal observation.

21. The method according to claim 20 wherein said discrete observation of said spatial type observation represents an item at a discrete location.

22. The method according to claim 20 wherein said linear observation of said spatial type observation represents an item running from a start position to a stop position.

23. The method according to claim 20 wherein said polygonal observation of said spatial type observation represents an area where said time-based observation data objects are observed.

24. The method according to claim 20 further comprising:
    tracking said linear observations and said polygonal observations interleaved with said discrete observations.

25. An apparatus for performing field data collection, the apparatus comprising:
    a mobile computer, said mobile computer comprising,
    a central processing unit;
    a system sound card connectable to said central processing unit;
    a microphone in communication with said system sound card, wherein said microphone and said system sound card cooperatively capture a verbal observation as audio data;
a central processing unit clock connectable to said central processing unit; and
a memory connectable to said central processing unit, wherein said central processing unit loads into said memory a reference grammar containing semantic information; and
a location receiver device in communication with said mobile computer for capturing location data contemporaneously with said verbal observation;
wherein said central processing unit clock time-stamps said captured audio data and time-stamps said location data received from said location receiver device;
and further wherein said central processing unit:
interprets said audio data using said reference grammar containing semantic information;
creates a recognized text data record;
merges said location data and said recognized text data record to form a time-based observation data object; and
converts said location data into a time-based track data object.

26. The apparatus according to claim 25 wherein said location receiver device captures location data comprising at least one of a latitude, a longitude, and an altitude.

27. The apparatus according to claim 25 further comprising:
at least one external device for capturing and sending external sensor data to said mobile computer, wherein:
said central processing unit clock time-stamps said captured external sensor data; and
said central processing unit correlates said captured audio data with said captured external sensor data.

28. The apparatus according to claim 27 wherein said at least one external device comprises at least one of a digital camera and a laser ranging device.

29. The apparatus according to claim 25 wherein said mobile computer further comprises:
a storage device connectable to said central processing unit, wherein said storage device stores:
a plurality of time-based track data objects which represent said mobile computer's historical travel path; and
a plurality of time-based observation data objects which represent a time sequence in which said plurality of time-based observation data objects were captured.

30. The apparatus according to claim 29 wherein said central processing unit loads into said memory a reference observation semantic that:
interprets a phrase comprised of at least two of said recognized text data records; and
detects semantic error conditions.

31. The apparatus according to claim 29 wherein said mobile computer further comprises:
a transfer means for transferring said plurality of time-based observation data objects and said plurality of time-based track data objects from said mobile computer to a processing computer for storage in a geographic information system database associated with said processing computer.

32. The apparatus according to claim 31 wherein said transfer means comprises at least one of a RF wireless transmitter and a wired electronic connection.

33. The apparatus according to claim 29 wherein said central processing unit associates said plurality of time-based track data objects with said plurality of time-based observation data objects to produce a tour object which comprises a correlated location, observation, and time data set.

34. The apparatus according to claim 25 wherein said location receiver device comprises a global positioning satellite receiver.

35. The apparatus according to claim 25 further comprising:
a means for transporting said mobile computer while performing field data collection.

36. The apparatus according to claim 35 wherein said means for transporting comprises at least one of a vehicle, a bicycle, a backpack, and a carrying by hand.

37. The apparatus according to claim 25 wherein said mobile computer further comprises:
an interactive display connectable to said central processing unit for enabling a user to perform quality assurance functions.

* * * * *